United States Patent [19]

Rees

[11] Patent Number: 5,530,332
[45] Date of Patent: Jun. 25, 1996

[54] STEPPER MOTOR DRIVE CIRCUIT

[75] Inventor: Charles E. Rees, Maidenhead, United Kingdom

[73] Assignee: Mars Incorporated, McLean, Va.

[21] Appl. No.: 284,567

[22] PCT Filed: Feb. 12, 1993

[86] PCT No.: PCT/GB93/00304

§ 371 Date: Aug. 9, 1994

§ 102(e) Date: Aug. 9, 1994

[87] PCT Pub. No.: WO93/16520

PCT Pub. Date: Aug. 19, 1993

[30]    Foreign Application Priority Data

Feb. 12, 1992 [GB] United Kingdom ............... 9202974

[51] Int. Cl.⁶ .................................................. H02P 8/00
[52] U.S. Cl. ...................... 318/685.000; 318/701.000; 318/260.000; 318/442.000; 318/599.000; 318/606.000
[58] Field of Search ........................ 318/685, 696, 318/701, 254, 138, 439, 256, 257, 260, 268, 271, 272, 280, 283, 286, 293, 440, 442, 599, 606

[56]    References Cited

U.S. PATENT DOCUMENTS

| | | | |
|---|---|---|---|
| 3,809,991 | 5/1974 | Loyzim | 318/696 |
| 3,967,179 | 6/1976 | Loyzim | 318/696 |
| 4,208,868 | 6/1980 | Regnier et al. | 318/138 |
| 4,223,260 | 9/1980 | Beer et al. | 318/696 |
| 4,295,083 | 10/1981 | Leenhouts | 318/696 |
| 4,353,021 | 10/1982 | Watanabe et al. | 318/696 |
| 4,358,725 | 11/1982 | Brendemuehl | 318/696 |
| 4,431,955 | 2/1984 | Faedi et al. | 318/696 |
| 4,464,616 | 8/1994 | Bourret et al. | |
| 4,510,422 | 4/1985 | Ogura | 318/254 |
| 4,638,235 | 1/1987 | Ogura | 318/696 |
| 4,684,865 | 8/1987 | Auger | |
| 4,847,544 | 7/1989 | Goldberg | 318/696 |
| 5,148,092 | 9/1992 | Ishii et al. | 318/696 |

FOREIGN PATENT DOCUMENTS

| | | |
|---|---|---|
| 0187224 | 7/1986 | European Pat. Off. . |
| 0199613 | 10/1986 | European Pat. Off. . |
| 0345224 | 6/1989 | European Pat. Off. . |
| 1286866 | 8/1972 | United Kingdom . |
| 1465114 | 2/1977 | United Kingdom . |
| 1496344 | 12/1977 | United Kingdom . |
| 1579044 | 11/1980 | United Kingdom . |
| 1579043 | 11/1980 | United Kingdom . |
| 1579121 | 11/1980 | United Kingdom . |
| A-2061570 | 5/1981 | United Kingdom . |
| A-2071941 | 9/1981 | United Kingdom . |
| 2076566 | 12/1981 | United Kingdom . |
| A-2194693 | 3/1988 | United Kingdom . |
| WO85/04061 | 9/1985 | WIPO . |
| WO91/06073 | 5/1991 | WIPO . |

OTHER PUBLICATIONS

Patent Abstracts of Japan, Unexamined Applications, The Patent Office Japanese Government, p. 149 E 661, No. 63–110996, 22 Sep. 1988 (NEC Corp.).
Patent Abstracts of Japan, Unexamined Applications, THE PATENT OFFICE JAPANESE GOVERNMENT, p. 12 E 699 No. 63–209 500, 27 Dec. 1988 (Canon Inc.).

*Primary Examiner*—Bentsu Ro
*Attorney, Agent, or Firm*—Fish & Richardson

[57]    ABSTRACT

A drive circuit for a stepper motor intended to drive a load, which circuit is adapted to operate in a chopper drive mode during a motor acceleration phase, and an L/R drive mode during a subsequent cruise phase.

29 Claims, 4 Drawing Sheets

STEPPER MOTOR DRIVE CIRCUIT

FIELD OF THE INVENTION

This invention relates to a drive circuit for a stepper motor.

BACKGROUND OF THE INVENTION

The background to the invention lies in a different field. In our British Patent Application published under no. 2 236 887 (which is incorporated herein by reference) there are disclosed rotatable mechanical coin escrow mechanisms. These are intended to be driven by an electric motor which rotates the drum of the mechanism by an integral number of complete rotations so as to cause coins selectively to be delivered to a cashbox, or returned to a user. The number of coins present in the escrow mechanism when it is to be driven varies greatly, and so therefore does the inertia of the mechanism, this being rather small when only the empty plastic drum has to be rotated but two or more times as great when the drum is carrying its maximum number of coins. The amount of friction to be overcome, both in the bearings of the drum and between the coins and the drum, also varies considerably.

A feasible, and conventional, system for rotating the drum would be a small high-speed DC electric motor driving the drum through a large reduction ratio gearbox, in conjunction with an indexing system such as an optically-sensed tooth wheel, for the purpose of detecting absolute drum position.

Low cost is an essential requirement in the applications for which such escrow mechanisms are intended, such as pay telephones, and a further requirement in that context is for the drive power to be derived from the telephone line.

Cheap, high-speed (say 3000 rpm) DC electric motors do not have sophisticated and therefore relatively expensive very low friction bearings, and relatively high frictional losses are also characteristic of cheap high reduction ratio gearboxes. It is therefore very difficult to produce cheap drive systems of the above kind which will have a sufficiently low power consumption (typically less than 100 mW) to permit their operation from telephone lines.

SUMMARY OF THE INVENTION

An object of the present invention is to provide a low-cost, low power consumption, electric drive system.

The present invention involves the realisation that a stepper motor could beneficially be used to drive such a coin escrow because its inherently low rotational speed means that friction losses in its own bearings are small, and also that a gearbox of much smaller reduction ratio can be used so that friction losses in the gearbox can also be reduced.

Various drive circuits for stepper motors are known, for controlling the application of the necessary drive pulses to the motor windings, but these have normally been designed with the object of achieving a desired output performance from the motor irrespective of power consumption. In the context envisaged by the present invention, although certain output performance criteria need to be met, nevertheless an overriding requirement is for the input power to be minimised to the greatest extent possible.

One performance criterion is that the motor should be able to rotate the drum of the escrow mechanism through each complete rotation in an acceptably short period of time, for example 400 ms, while consuming as little power as possible, and for this speed of rotation to be achieved within acceptable power limits even when the inertia and friction of a load in which both these factors may vary are at their maxima.

According to a first aspect of the present invention, there is provided a drive circuit for a stepper motor intended to drive a load, which circuit is arranged in use to operate in a chopper drive mode during a motor acceleration phase, characterised in that said circuit is arranged in use to operate in an L/R (non-chopped) drive mode during a subsequent cruise phase.

According to a second aspect of the present invention there is provided apparatus for driving a stepper motor intended to drive a load, characterised in that said apparatus comprises means for determining, before driving the load, the expected load to be driven and means for selecting a level of power input to the motor in dependence upon the expected load.

The chopper drive mode enables a high torque to be achieved in order to accelerate the motor, thus reducing the time the motor takes to reach an acceptably high and constant "cruise" speed at which it will perform most of its rotation. The power consumption during the acceleration phase is relatively high, but by maximising the length of the cruise phase during which the substantially more efficient L/R drive mode is used, the overall power consumption of the motor in achieving a complete cycle of operation, back to rest, can be significantly improved. This is especially so if the drive circuit reverts to the chopper drive mode during a deceleration phase in order to bring the motor to a halt in a short period, as in the preferred embodiment.

Preferably, the drive circuit is adapted to provide to the motor windings a higher voltage during the acceleration phase to ensure chopper drive mode operation, and a lower voltage during the cruise phase to ensure L/R mode operation. The higher the voltage of each drive pulse during the acceleration phase, the faster the current rises in the motor winding, to the appropriate threshold level in the region of which the winding current is stabilised by the operation of the chopper drive mode. The fast rise time resulting from the higher voltage maximises the value of the average winding current during the period of each drive pulse and hence maximises the torque available, thus contributing to the shortening of the acceleration phase and corresponding lengthening of the more efficient cruise phase. The lower voltage provided to the motor windings during the cruise phase is insufficient to produce a current level exceeding the threshold level within the duration of the drive pulse so that the winding current rises continuously and exponentially throughout the duration of the applied drive voltage pulse, at a rate determined only by the time constant of the winding and associated drive circuitry. Hence the magnetic losses, $I^2R$ losses, and losses in the freewheeling diodes, which are all associated with the chopper drive mode, and which will be referred to again later, are no longer present, which contributes to the greater efficiency of the L/R drive mode. The term "L/R drive mode" is used since it is the inductance of the motor windings and the resistance of, and associated with, them that determine the time constant which controls the current rise during this mode at any given supply voltage and motor speed, as distinct from any chopper control.

Although a relatively high voltage is always used during the chopper drive acceleration phase, to achieve a fast current rise time, it is preferred for the drive circuit to be adapted to select between different threshold current levels. Then, a lower threshold current level is selected when it is known that the inertial load having to be accelerated is relatively low, and a higher threshold current level is selected when the inertial load is known to be higher. Thus, drawing excessive current in relation to the inertial load is avoided, but within that constraint the torque available for accelerating the load is optimised because the fast rise time keeps the average current during the drive voltage pulse close to the threshold current, at least during the early stages of acceleration. As the speed increases, the increasing induced back-e.m.f. and the shortening of the drive pulse reduce the average current.

The drive circuit is preferably further adapted so as to select between different voltages for provision to the motor windings during the cruise phase. The optimum voltage will be the one which is high enough to produce a torque, in the L/R drive mode, sufficient to maintain the speed of the motor against whatever frictional resistance is present in the load, to avoid stalling, but low enough for the winding current not to rise above the threshold level for L/R mode operation during the length of each voltage drive pulse. The selected voltage level may be predetermined by theoretically and empirically establishing what voltage level is suitable for different values of frictional load, or it may be arrived at by automatically stepping down the voltage from its acceleration phase value until chopping actually ceases, this being indicative of operation in the L/R mode, and then holding the applied voltage at that value throughout the cruise phase.

Since the objective is to minimise power drawn from a source (e.g. a telephone line) the power supply circuit for providing the various voltages required should itself be of a low-loss type and preferably is a switched mode power supply.

A further preferred feature is for the drive circuit to be adapted to apply biphase drive to the motor windings during the acceleration phase. Although this draws relatively high current, it also produces more torque so that the acceleration phase is further shortened and the more efficient cruise phase correspondingly lengthened, the overall result being a further decrease in the power required per drive cycle.

Although biphase drive is preferred during the acceleration phase, the drive circuit preferably is adapted to apply wavedrive to the motor windings during the cruise phase as sufficient torque is still generated for the cruise phase, enabling lower current consumption than when in biphase drive.

For bringing the motor and its load to a halt at the end of a drive cycle the cruise phase is followed by a deceleration phase during which preferably the same high torque-producing drive mode will be used as was used during the acceleration phase. The resulting rapid deceleration thus takes a shorter proportion of the entire drive cycle and leaves a greater proportion to be occupied by the highly power-efficient cruise phase, thus again contributing to overall low power consumption.

The drive circuit preferably includes a control circuit, in the preferred embodiment in the form of a microprocessor, which is programmed with the duration of the acceleration, cruise and deceleration phases, each in terms of a predetermined number of motor drive steps and which is further programmed to cause the appropriate mode of drive to be applied to the motor windings in accordance with which of the three phases of the drive cycle is presently in operation.

The control circuit may also be programmed so as to select, and switch to, the appropriate voltage level to be applied to the motor windings, and the appropriate threshold current level to be maintained during the chopper drive mode.

A drive cycle may consist of a predetermined number of motor steps constituting the acceleration phase, a further and larger predetermined number of motor steps constituting the cruise phase, and a smaller number of steps constituting the deceleration phase. Then, a complete drive cycle will be a fixed number of motor drive steps. If the motor is required to rotate through several complete drive cycles, then the control circuit may be arranged to cause the drive circuit to apply the acceleration phase, cruise phase and deceleration phase modes of operation the appropriate number of times in an uninterrupted sequence.

This is done in the embodiment to be described below, and it results in the motor being halted between successive drive cycles. However, it is also possible to employ a longer drive cycle (e.g. one having a number of steps which is an integral multiple of the number of steps in a basic drive cycle) which starts with an acceleration phase set of steps and finishes with a deceleration phase set of steps, and has a continuous sequence of cruise phase steps in between.

BRIEF DESCRIPTION OF THE DRAWINGS

In order that the invention may be more clearly understood a preferred embodiment thereof will now be described with reference to the accompanying diagrammatic drawings in which.

DETAILED DESCRIPTION

First, FIG. 1 will be described briefly, and then in more detail later.

A stepper motor 2 drives the input of a reduction gearbox 4 whose output drives the rotating drum of a coin escrow mechanism 6 such as is described in the British patent application previously referred to. The entire system is incorporated in a payphone, where the function of the escrow mechanism 6 is to receive coins that have been found to be acceptable, to deliver coins that are required to pay for a telephone call to a cashbox, and to return coins that are not required to pay for the telephone call to a user. A drum of the escrow mechanism has to be rotated between positions where it can receive a coin, deliver a coin to the cashbox, and return a coin to the user. The number of rotations of the drum between its present position, and its next required position, will be an integral number.

Figure 1:
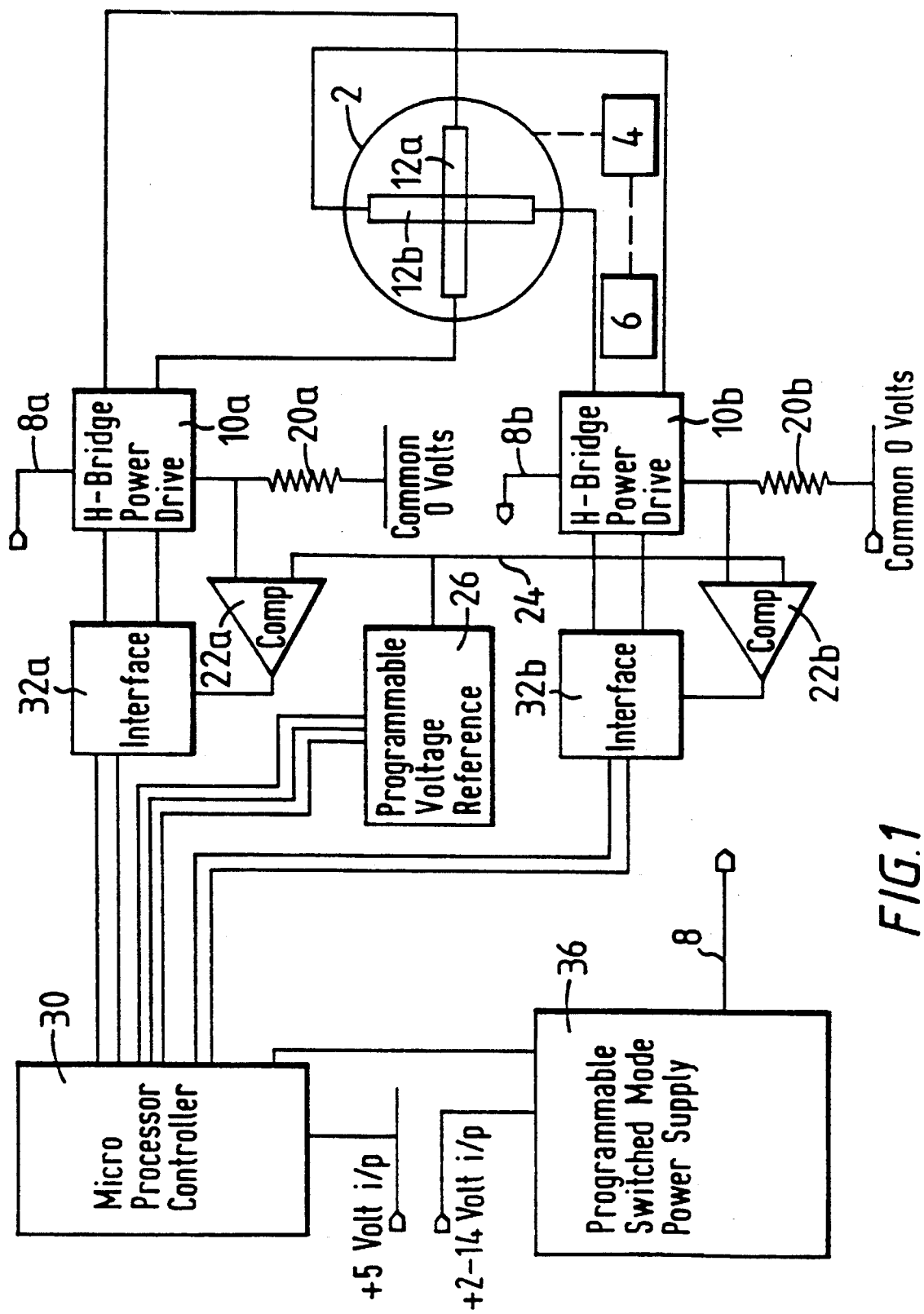
FIG. 1 is a block diagram of a drive circuit for a stepper motor, in accordance with the invention.

The use of a twenty-four step per revolution bipolar motor is envisaged, but it is illustrated in the conventional simplified manner in FIG. 1, as will be appreciated by those skilled in the art. Gearbox 4 is then a 9:1 reduction ratio gearbox so that 216 motor steps would be required to rotate the drum of the escrow mechanism 6 through a single revolution.

For the purpose of driving the motor 2, a supply voltage is provided on lines 8a and 8b respectively to a pair of H-bridge power switch circuits 10a and 10b. Such circuits are well known, and a suitable example is schematically shown and described on pages 18 and 19 of "Stepping motors: a guide to modern theory and practice" by P. P. Acarnley (IEE Control Engineering Series 19). The discrete forcing resistance shown there may be omitted, but resistance will still be present in the motor windings and the other components of the H-bridge circuit. Freewheeling diodes are also shown, whose function is well known in the art.

As is also well known in the art, the function of the switch circuits 10a and 10b is to switch the voltages from lines 8a and 8b (these voltages being equal) to the windings in the appropriate sequence. The sequence for the cruise phase is: first with one polarity on to windings 12a of the motor; second with one polarity on to windings 12b; third with the opposite polarity from before on to windings 12a and fourth in the opposite polarity from before on to windings 12b, the sequence being such that the windings collectively generate a rotating magnetic field whose rotation is to be followed by the rotor of the motor so as to rotate the load represented by the gearbox 4 and the drum of the escrow mechanism 6 plus any coins in the drum.

This sequential application of voltage pulses to the motor windings is represented by the four pulses 16 a, b, c and d in FIGS. 4e, 4f, 4g and 4h, respectively, which are in the non-overlapping wave drive pattern to be used in a cruise phase. In an acceleration phase, the windings are energised in the same order, but the pulses are overlapped so as to achieve biphase drive, as shown at 14a, b, c and d in FIGS. 4a, 4b, 4c and 4d, respectively.

Figure 2:
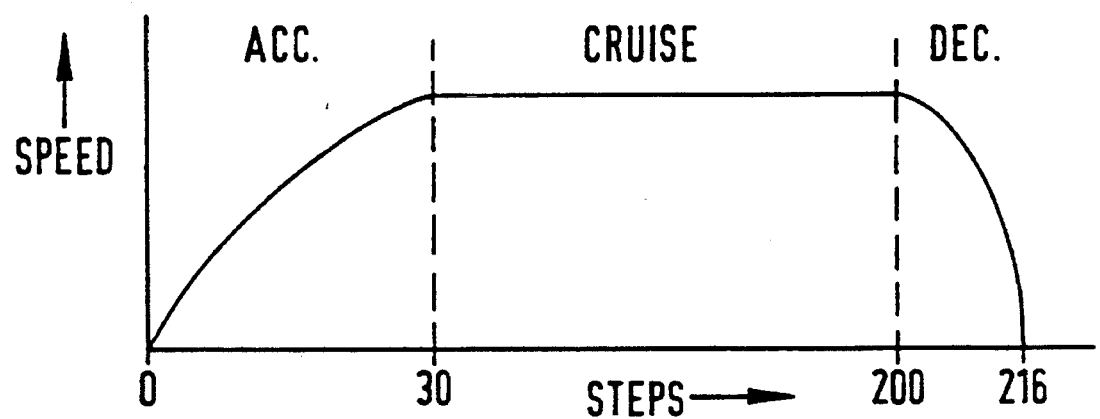
FIG. 2 shows how the speed of the stepper motor varies during one drive cycle.
Figure 3:
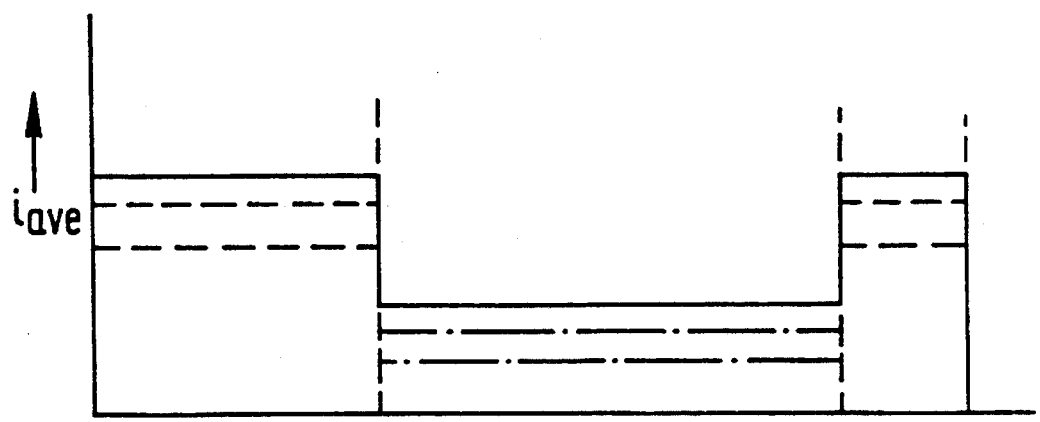
FIG. 3 shows how the average current being consumed by the stepper motor varies during one drive cycle.
Figure 4A:
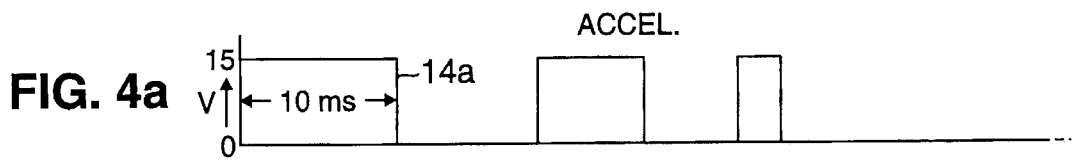
FIGS. 4a, 4b, 4c and 4d and 4e, 4f, 4g and 4h illustrate, respectively, the pulses of drive voltage being applied to the motor windings during acceleration and cruise phases.
Figure 4B:
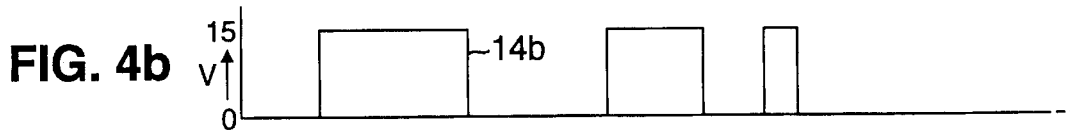
Figure 4C:
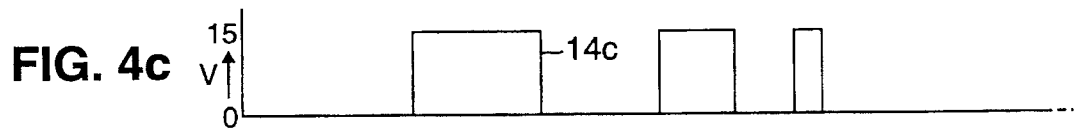
Figure 4D:
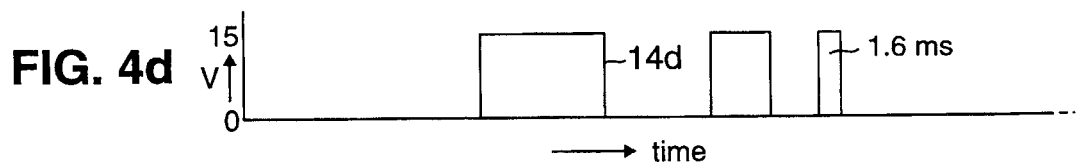
Figure 4E:
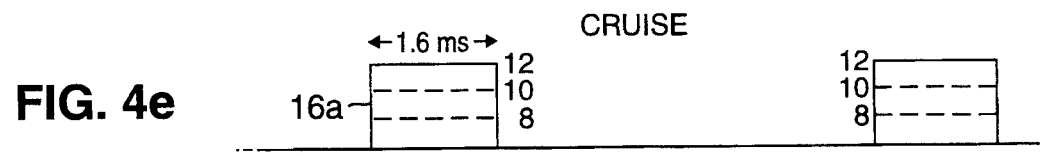
Figure 4F:
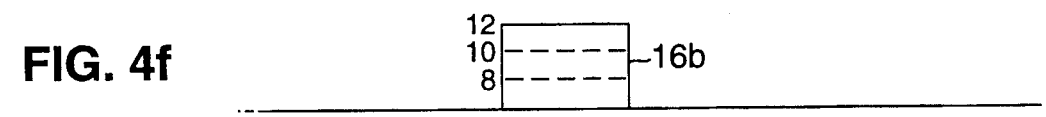
Figure 4G:
Figure 4H:
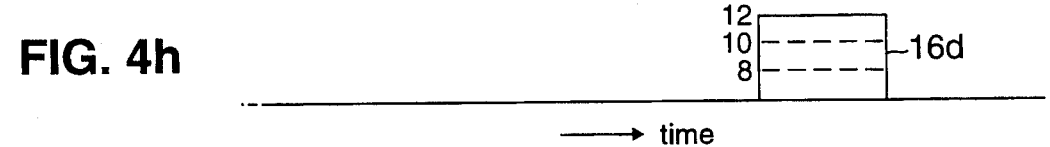

Turning now to FIG. 2, this illustrates how the invention is intended to create three different phases during the operation of the motor through a single 216-step drive cycle; namely an acceleration phase during which motor speed rises from zero to a constant speed which is maintained throughout a cruise phase, and which in turn is followed by a deceleration phase during which motor speed is reduced to zero.

As previously mentioned, for practical purposes, in the preferred embodiment, it is desirable to accomplish a single drive cycle in approximately 400 ms. By a process of theory and experiment the possible durations of the three phases can be established, in terms of numbers of motor steps. For example, in connection with the preferred embodiment it was established that a suitable cruise speed could be reached by means of an acceleration phase lasting for 30 steps, and that deceleration could be achieved within 16 steps, since during the deceleration phase the frictional component of the load is helping rather than hindering the change of speed of the motor. The general objective is to minimise the duration of the acceleration and deceleration phases, in which power consumption is relatively high, so as to maximise the length of the cruise phase during which power consumption is relatively low, in such a way as to minimise the energy used during the entire drive cycle.

FIGS. 4a, 4b, 4c, 4d, 4e, 4f, 4g, 4h, 5a and 5b are useful for explaining how this is achieved in the preferred embodiment.

Figure 5A:
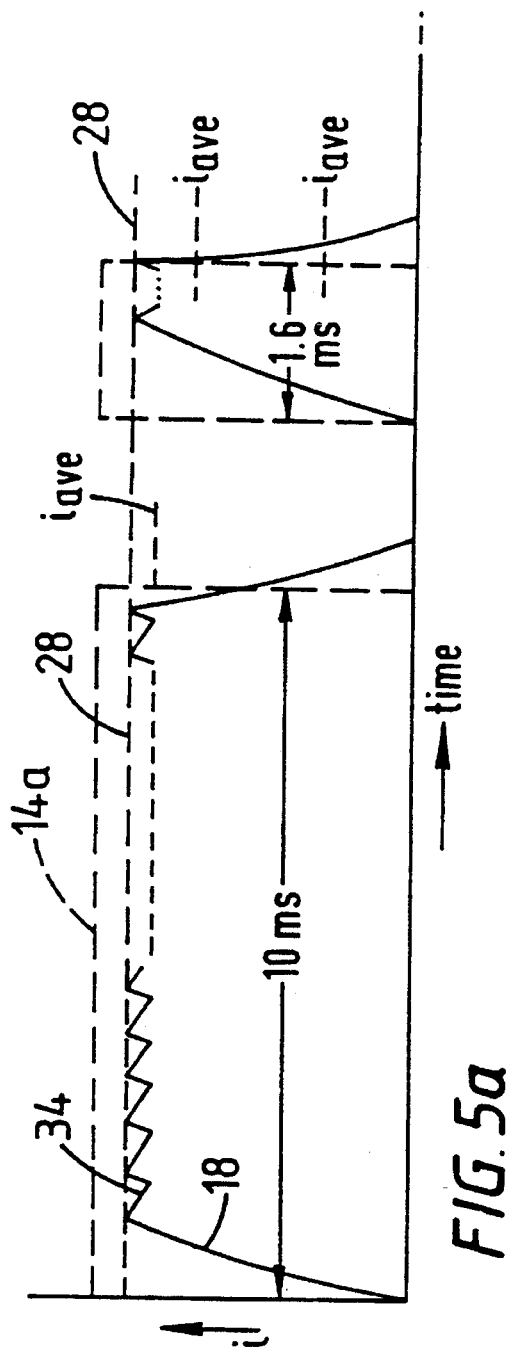
FIGS. 5a and 5b illustrate the current flow through a motor winding during a single voltage drive pulse during, respectively, the acceleration phase and the cruise phase.
Figure 5B:
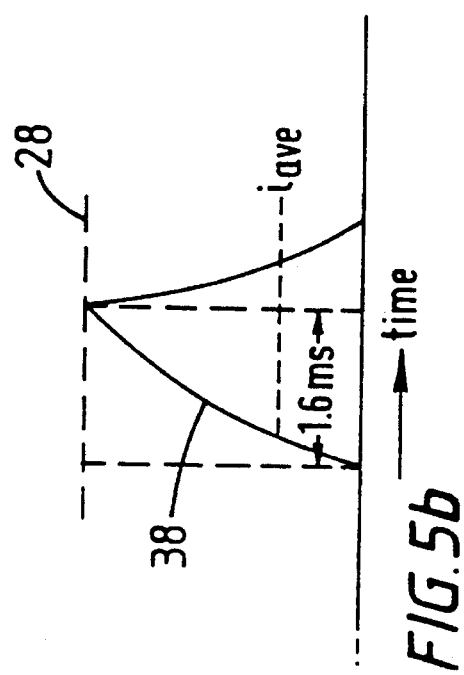

The manner of driving the motor during the acceleration phase is illustrated by FIGS. 4a, 4b, 4c, 4d and 5a and it involves the use of a biphase pattern of drive voltage pulses as shown in FIGS. 4a, 4b, 4c and 4d, and also operation in a chopper drive mode to control winding current as illustrated in FIG. 5a.

The pattern of voltage pulses applied from the H-bridge power switches 10a and 10b to the windings 12a and 12b is shown in FIGS. 4a, 4b, 4c and 4d from which it can be seen that the pulses are applied in cycles of four to the windings, the cycles being continuously repeated, each pulse overlapping the previous one, which is the characteristic of biphase drive, each pulse being shorter than the previous one, and the frequency of the pulses gradually increasing. The pulse rate must increase in order to cause the motor to accelerate and the torque available for acceleration is maximised by having the pulses longer at lower frequency than at higher frequency and also by the use of the biphase drive technique itself. The increase in frequency of the applied pulses is made appropriate to overcome the system inertia. In this particular example, the first pulse 14a is 10 ms in length, corresponding to a frequency of 100 Hz and the pulse length is progressively decreased to 1.6 ms at the end of the acceleration phase, this corresponding to a frequency of 625 Hz. For simplicity, not all of the pulses comprised in the acceleration phase are shown in FIGS. 4a, 4b, 4c and 4d.

FIG. 5a shows, on an expanded time scale and in broken lines, the voltage pulse 14a having a duration of 10 ms. The solid line shows the resulting flow of current in the windings 12a to which the voltage pulse is applied. These windings are connected in circuit with the H-bridge switch circuit 10, and so the windings in conjunction with H-bridge switch circuit 10a have a time constant proportional to L/R where L is the inductance of the windings and R is the total resistance in the circuit including the windings themselves.

The voltage supply on lines 8a and 8b can be altered in a manner which will be described later. For the purpose of the acceleration phase, this voltage is set to a high level, for example 15 volts, to ensure that the current in windings 12a rises very fast as shown at 18 in FIG. 5a and thus, virtually immediately, the winding generates a substantial field applying correspondingly substantial torque to the rotor of the motor 2.

A chopper drive mode is employed during the acceleration phase. This is implemented by means of a current sensing resistor 20a which carries the current being applied to windings 12a and across which is developed a voltage proportional to that current. That voltage is compared in a comparator 22a with a reference voltage provided on line 24 from a programmable voltage reference 26. The voltage on line 24 sets a current threshold indicated at 28 in FIG. 5a and when the fast-rising winding current 18 reaches that threshold the output of comparator 22a changes.

This change is signalled to a control circuit in the form of a microprocessor 30, via an interface circuit 32a, in response to which the microprocessor 30, via the interface circuit 32a, operates the H-bridge switch circuit 10a to interrupt the application of the voltage pulse 14a to windings 12a.

The current in windings 12a then starts to decay as indicated at 34 in FIG. 5a, until it lies below the threshold 28, at which time comparator 22a changes its output again and the voltage of pulse 14a is once again applied to the windings 12a. This cycle of switching the voltage pulse onto and off of the windings 12a is continued until the voltage pulse 14a ceases. Consequently, throughout the duration of the voltage pulse 14a, the high voltage of that pulse is being chopped at a relatively high frequency while the current through windings 12a oscillates or sawtooths about the threshold level 28 until eventually falling back to zero when the voltage pulse ceases. The actual chopping frequency is much higher than would appear from FIG. 5a, where the current sawtooth period is expanded for ease of illustration.

Because of the very fast current rise time caused by the high applied voltage, the average current $i_{ave}$ flowing through the windings over the duration of the voltage pulse 14a lies very close to the set current threshold 28 as indicated in FIG. 5a and the torque applied to the rotor of the motor is therefore maximised within the current constraint that has been set.

The same process occurs, with the voltage pulses maintained at the high level of 15 volts, for the subsequent voltage pulses 14b, 14c, 14d and all those pulses that follow during the acceleration phase.

However, when the drive pulses have been reduced to their shortest length of 1.6 ms, as shown to the right in FIG. 5a, the rise time of the winding current is occupying a greater proportion of the length of the voltage pulse, for two reasons. Firstly, the voltage pulse is shorter, and secondly the rate of current increase is reduced because it is opposed by the back EMF induced in the windings by the rotor which by now is travelling faster. Consequently the average current $i_{ave}$ flowing during the drive voltage pulse is now significantly less than the current threshold and the benefits of chopper drive are reducing.

Although the chopper drive mode is desirable for its high starting torque and resulting rapid acceleration, the very high-speed switching of the voltage onto, and off of, the windings during this chopper drive mode of operation causes undesirable magnetic losses, $I^2R$ losses, and losses in the freewheeling diodes of the switch circuits 10a and 10b.

Further acceleration is not required, because faster rotation of the drum of the escrow mechanism may cause it to malfunction. Only the friction in the load now has to be overcome and so a reduced average winding current will be sufficient. One possibility would be to reduce the threshold current 28, which would reduce the average current, but the losses associated with the chopper drive mode would remain. In the present system, these losses are avoided throughout the cruise phase.

The microprocessor 30 is programmed such that after it has caused the 30 drive pulses representing the acceleration phase to be delivered as just explained, it changes the operation of the drive circuit into an L/R drive mode throughout the cruise phase of 170 steps.

The voltage on lines 8a and 8b, which during the acceleration phase is 15 volts, is derived from the output line 8 of a programmable switched-mode power supply 36, the output voltage of which is selectable by microprocessor 30. In order to initiate the cruise phase, the microprocessor 30 cause the power supply 36 to reduce its output voltage, for example to 12 volts. The reduced voltage needs to be sufficiently low to ensure that the current in the motor windings rises sufficiently slowly, as shown at 38 in FIG. 5b, that it does not reach, or only just reaches, the current threshold 28 by the time the 1.6 ms voltage pulse 16a terminates. This ensures the L/R mode in which the current rise is controlled entirely by the time constant characteristic of the motor windings in conjunction with the H-bridge power switch at a given speed and applied voltage. No chopping occurs, and so the losses associated with chopping are avoided. It has been found that in L/R mode the speed of the motor can be maintained with a 20% or more reduction in energy used per motor step, as compared with maintenance of the chopper drive mode at the original higher motor input voltage.

Additionally, throughout the cruise phase, the microprocessor 30, acting through interface circuits 32a and 32b, causes the H-bridge switch circuits 10a and 10b to apply the voltage pulses in a wavedrive pattern to the motor windings as illustrated in FIGS. 4e, 4f, 4g and 4h in which instead of the pulses overlapping in time, an existing pulse to a winding ceases simultaneously with the application of the next pulse to the next winding. This causes a further decrease in the energy used per step, as compared with the biphase drive pattern employed during the acceleration phase.

When the microprocessor 30 reaches the 200th step, which it has been programmed to define as the end of the cruise phase, it sets the output voltage of power supply 36 back to the high level of 15 volts so that the H-bridge power switches 10a and 10b start operating in chopper drive mode again, and re-establishes biphase drive. The microprocessor now also progressively reduces the frequency of the voltage pulses and increases their length, so that the system is operating as it did in the acceleration phase but in the opposite sense, so as to slow the rotor down. Whereas during acceleration the frictional load on the motor had to be overcome, during the deceleration phase it is assisting the deceleration of the rotor and so deceleration to a halt can be achieved in fewer steps, for example in this embodiment 16 steps, and the microprocessor 30 is programmed accordingly, so that it stops causing drive pulses to be applied to the motor after the 216th step, thus stopping the motor when the drum of the escrow mechanism 6 has been driven through one complete rotation.

If more than one complete rotation of the drum of escrow mechanism 6 is required, then the microprocessor 30 is instructed accordingly and it causes the complete cycle of acceleration, cruise and deceleration drive signals to be applied to the motor the appropriate number of times.

In the preferred embodiment two further features are provided enabling further power savings to be achieved. Firstly, the coin sensing and routing circuitry in the pay telephone of which the escrow mechanism 6 forms a part will know, at any given time, how many and/or what type of coins are in the escrow mechanism. The inertia of the escrow mechanism drum plus the coins obviously depends upon the coin number and type. When the inertia is low, less torque will be needed to accomplish the acceleration phase in 30 motor steps and so to avoid wasting power the microprocessor 30 is connected to the coin mechanism circuitry so as to be informed of current drum inertia. It responds to an indication of lower inertia by altering the output voltage of the programmable voltage reference 26, so as to reduce the current threshold 28 which controls chopping during the acceleration phase. Thus, power consumption during the acceleration phase is reduced while torque remains sufficient to achieve the cruise speed in thirty motor steps. Several different threshold current levels may be selected in this way, appropriately related to different values of inertia of the lead.

Secondly, during the cruise phase, the amount of torque required to maintain the motor speed is dependent primarily upon how much friction needs to be overcome and that, in turn, will depend also upon the number and type of coins contained in the drum of the escrow mechanism. Since this is known, as indicated above, that information can be used by the microprocessor 30 to switch the power supply 36 such that on line 8 it produces a lower voltage level than the 12 volts previously referred to, during the cruise phase, when the frictional lead is low so that the winding current will rise even more slowly, and to a lesser peak, than was illustrated at 38 in FIG. 5b, thus reducing the power consumption during the cruise phase even further. FIGS. 4e, 4f, 4g and 4h illustrate the possibility of having three different lower voltages available for the cruise phase namely 12 volts, 10 volts and 8 volts, to suit three different levels of frictional load.

Of course, the components having suffix "b" in FIG. 1 carry out the same functions, in relation to windings 12b as do those with suffix "a" in relation to windings 12a.

It will be appreciated that the stepper motor and drive system described may be used in other applications than driving a coin escrow mechanism, and also that its energy reducing characteristics may be beneficial in other situations than line-powered payphones, for example in battery powered equipment.

The use of biphase drive to start the motor and accelerate it not only enables the cruise phase to be shortened due to the higher torque available, but has a further advantage, compared with wave drive, in that it is unnecessary to start the drive pulse sequence with several pulses at a fixed frequency in order to ensure rotation in the correct direction before increasing the frequency to accelerate the motor. This is an additional factor in shortening the acceleration phase and in saving current during the first few pulses, and might be used in conjunction with a wave drive cruise phase without also changing between chopper and L/R drive modes.

The preferred embodiment has features that contribute in various ways to the reduction of power consumption but they may be selectively omitted where appropriate and it is believed that the invention in its broadest sense encompasses the general principle of using a higher-torque drive regime during an acceleration phase (and preferably also during a deceleration phase) and a lower-torque, lower power consumption drive regime during a cruise phase; further, that it encompasses the general principle of selecting the level of power input in dependence upon detected characteristics of the load, such as inertia in relation to an acceleration phase and/or frictional load in relation to a cruise phase.

I claim:

1. A drive circuit for applying drive control voltages to windings of a stepper motor intended to drive a load, comprising:

a control circuit means for causing the drive circuit to operate in a chopper drive mode during a motor acceleration phase comprising a plurality of steps of progressively increasing frequency for applying DC pulses directly to the stepper motor windings, and for causing the drive circuit to operate in an L/R (non-chopped) drive mode during a subsequent motor cruise phase comprising a plurality of further steps, wherein the drive circuit applies an intermittent higher voltage pulse to the motor windings during each of said plurality of steps of the motor acceleration phase, and the drive circuit applies a continuous lower voltage pulse to the motor windings during each of said plurality of steps of the motor cruise phase.

2. A drive circuit as claimed in claim 1 arranged in use to select between different threshold current levels for use in the chopper drive mode.

3. A drive circuit as claimed in claim 2 arranged in use to select the threshold current level in dependence upon the inertia of the load.

4. A drive circuit as claimed in claim 1 arranged in use to select between different voltages for provision to the motor windings during the cruise phase.

5. A drive circuit as claimed in claim 4 arranged in use to select the cruise phase voltage in dependence upon the steady-speed frictional resistance of the load.

6. A drive circuit as claimed in claim 5 further comprising a switched mode power supply for providing said different voltages.

7. A drive circuit according to claim 1 arranged in use to apply biphase drive to the motor windings during the acceleration phase.

8. A drive circuit according to claim 1 arranged in use to apply single phase drive to the motor windings during the cruise phase.

9. A drive circuit according to claim 1 wherein the plurality of steps of progressively increasing frequency includes the shortening of the length of the drive pulses to the motor windings during the acceleration phase.

10. A drive circuit as claimed in claim 1 adapted to operate in a motor deceleration phase following the cruise phase, wherein the motor deceleration phase operates in the same manner as the acceleration phase.

11. A drive circuit as claimed in claim 10 wherein the duration of the deceleration phase is preprogrammed into the control circuit means.

12. A drive circuit as claimed in claim 10, wherein the duration of the acceleration phase, cruise phase and deceleration phase is defined to be a predetermined number of motor drive steps.

13. A drive circuit as claimed in claim 12, wherein the predetermined number of motor drive steps in the acceleration, cruise and deceleration phases defines a motor drive cycle.

14. A drive circuit as claimed in claim 13 wherein the motor drive cycle corresponds to a whole number of rotations of the motor.

15. A drive circuit as claimed in claim 13 arranged in use to drive the motor only through a selectable whole number of motor drive cycles.

16. A drive circuit as claimed in claim 1, wherein the control circuit means is preprogrammed with the duration of the acceleration phase.

17. A drive circuit as claimed in claim 16, wherein the duration of the cruise phase is preprogrammed into the control circuit means.

18. A drive circuit as claimed in claim 1, wherein the stepper motor drives a coin escrow mechanism.

19. A drive circuit as claimed in claim 18, wherein the coin escrow mechanism is disposed in a pay telephone, and wherein the stepper motor is driven by power from a telephone line.

20. The drive circuit of claim 1, further comprising:

at least one current sensing resistor; and at least one voltage comparator, wherein the current flowing in the motor windings is sensed and a voltage that is proportional to the current is developed across the resistor, and that voltage is compared in the comparator to a predetermined reference voltage so as to adjust the chopping frequency of the voltage signals generated during the chopper drive mode.

21. The drive circuit of claim 1, wherein the duration of the motor acceleration phase and of the motor cruise phase is predetermined.

22. A method for using a drive circuit to operate a stepper motor intended to drive a load, comprising:

driving the stepper motor in a chopper drive mode during a motor acceleration phase comprising a plurality of steps of progressively increasing frequency for applying DC pulses directly to the stepper motor windings; and driving the stepper motor in an L/R (non-chopped) drive mode during a motor cruise phase comprising a plurality of further steps, wherein windings of the stepper motor are provided with an intermittent higher voltage pulse during each of said plurality of steps of the acceleration phase and a continuous lower voltage pulse during each of said plurality of steps of the cruise phase.

23. A method as claimed in claim 22 further comprising the step of selecting between threshold current levels for use during the chopper drive mode in dependence on the inertia of the load.

24. A method as claimed in claim 22 further comprising the step of selecting between threshold voltage levels for providing to the stepper motor windings for use during the cruise phase in dependence on the steady-speed frictional resistance of the load.

25. A method as claimed in claim 22 further comprising the steps of:

applying biphase drive signals to the stepper motor windings during the acceleration phase; and applying single phase drive signals to the stepper motor windings during the cruise phase.

26. A method as claimed in claim 22 wherein the plurality of steps of progressively increasing frequency further comprises the step of shortening the length of drive pulses to the stepper motor windings during the acceleration phase.

27. A method as claimed in claim 22 further comprising the step of driving the stepper motor in a chopper drive mode during a motor deceleration phase following the cruise phase.

28. The method of claim 22, further comprising:

sensing the current flowing in the motor windings during the motor acceleration phase;

generating a proportional voltage;

comparing the proportional voltage to a predetermined threshold voltage; and adjusting the frequency of the voltage signals generated during the chopper drive mode depending on the outcome of the comparison.

29. The method of claim 22, further comprising:

setting a predetermined duration limit for the motor acceleration phase; and setting a predetermined limit for the motor cruise phase.

* * * * *